United States Patent [19]

Miranti, Jr.

[11] 4,443,281
[45] Apr. 17, 1984

[54] METHOD OF MAKING AN ARCHED ENDLESS BELT

[75] Inventor: Joseph P. Miranti, Jr., Nixa, Mo.

[73] Assignee: Dayco Corporation, Dayton, Ohio

[21] Appl. No.: 232,326

[22] Filed: Feb. 6, 1981

[51] Int. Cl.³ .............................................. B29H 7/22
[52] U.S. Cl. ..................................... 156/140; 474/271
[58] Field of Search ............... 156/137, 138, 139, 140, 156/141, 142; 474/265, 266, 261, 238, 240, 242, 246, 247, 271; 264/326, 328.3

[56] References Cited

U.S. PATENT DOCUMENTS

| | | | |
|---|---|---|---|
| 2,062,568 | 12/1936 | Freedlander | 474/265 |
| 3,353,419 | 11/1967 | Richmond | 474/264 |
| 3,564,933 | 2/1971 | Clinkerbeard | 474/264 |
| 3,615,988 | 10/1971 | Richmond | 156/141 |
| 3,995,507 | 12/1976 | White et al. | 474/264 |
| 4,019,399 | 4/1977 | Waugh | 156/138 |
| 4,083,261 | 4/1978 | Spear et al. | 474/268 |

Primary Examiner—Michael W. Ball
Attorney, Agent, or Firm—Joseph V. Tassone

[57] ABSTRACT

A method of making an arched endless belt and belt made employing the method are provided wherein the method comprises the steps of disposing in tubular form a plurality of uncured belt-defining layers with the layers being adapted to define corresponding sections of the belt and curing the layers in a controlled environment to define the belt having a longitudinal axis and an arched configuration relative to the axis wherein prior to the disposing step the method comprises wrapping a shaping material consisting of an uncured gum material around a belt building device and the disposing step comprises wrapping the plurality of layers against the shaping material so that during the curing step the shaping material and controlled environment cooperate to define the arched configuration of the belt including all of its layers and during the curing step the shaping material is bonded to the layers and comprises an inner portion of the belt with the cured gum shaping material serving as a crack barrier for such inner portion.

22 Claims, 15 Drawing Figures

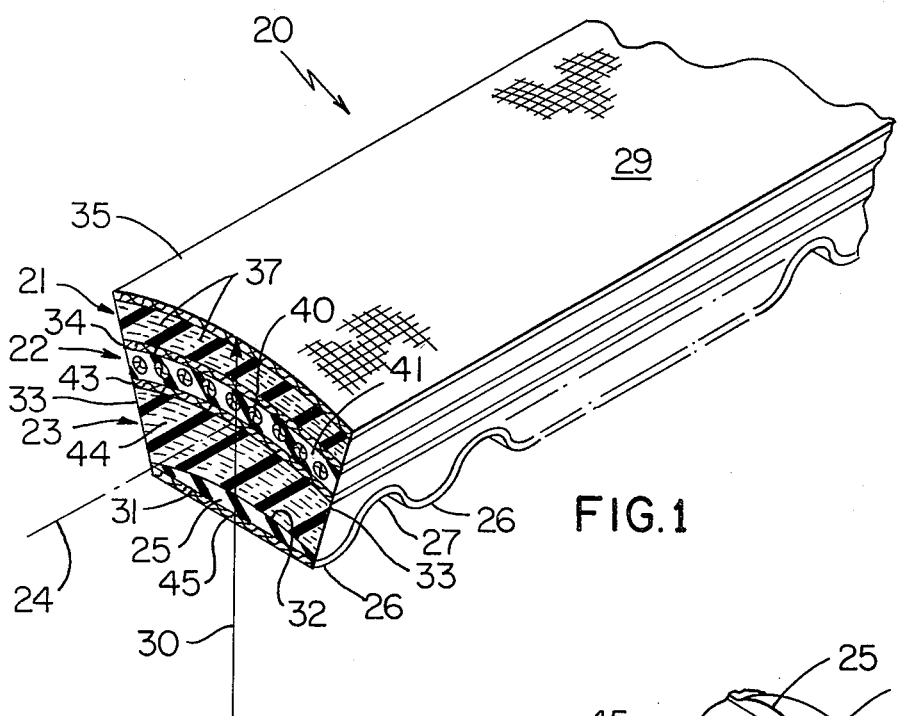
FIG.1
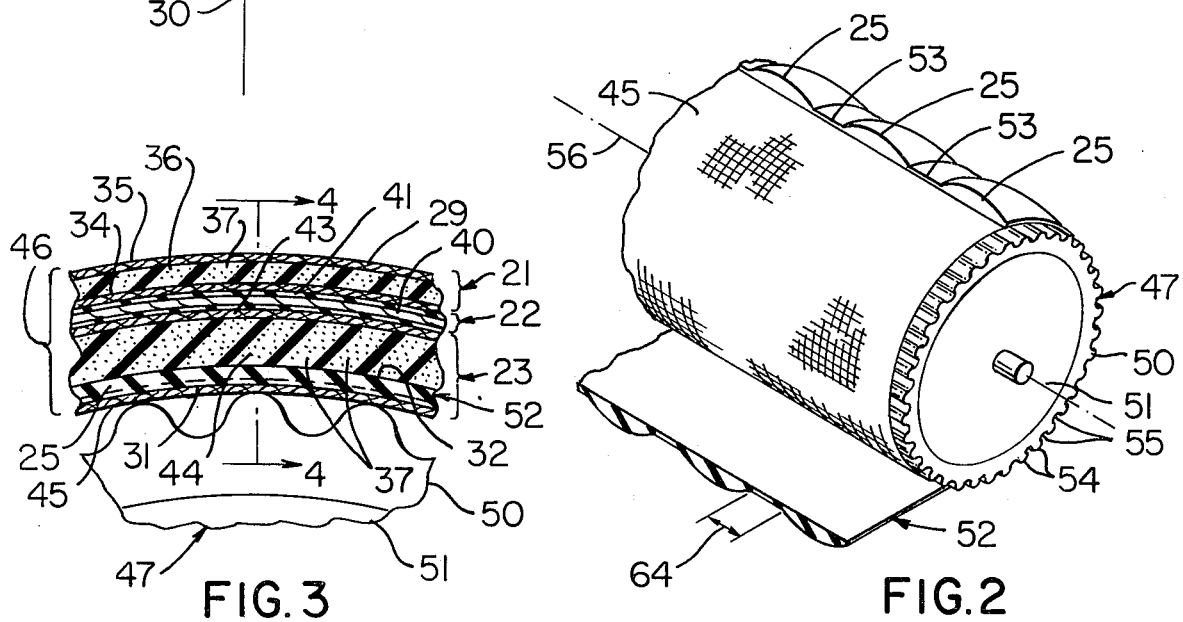
FIG.3
FIG.2
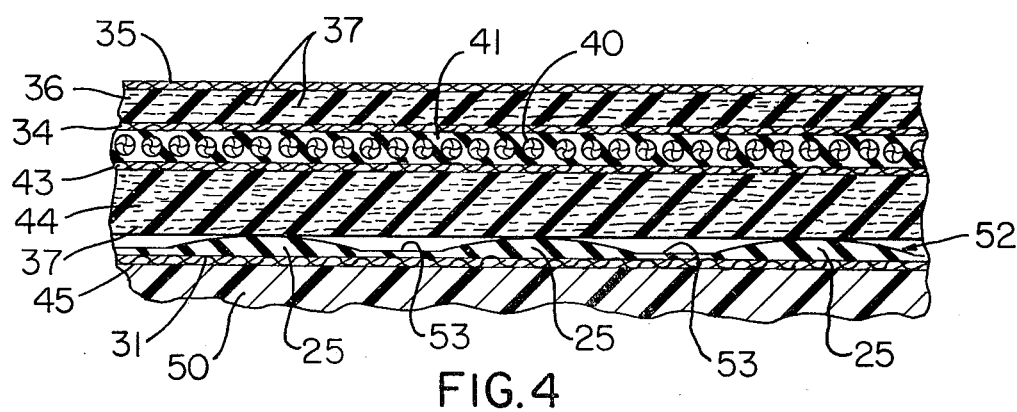
FIG.4

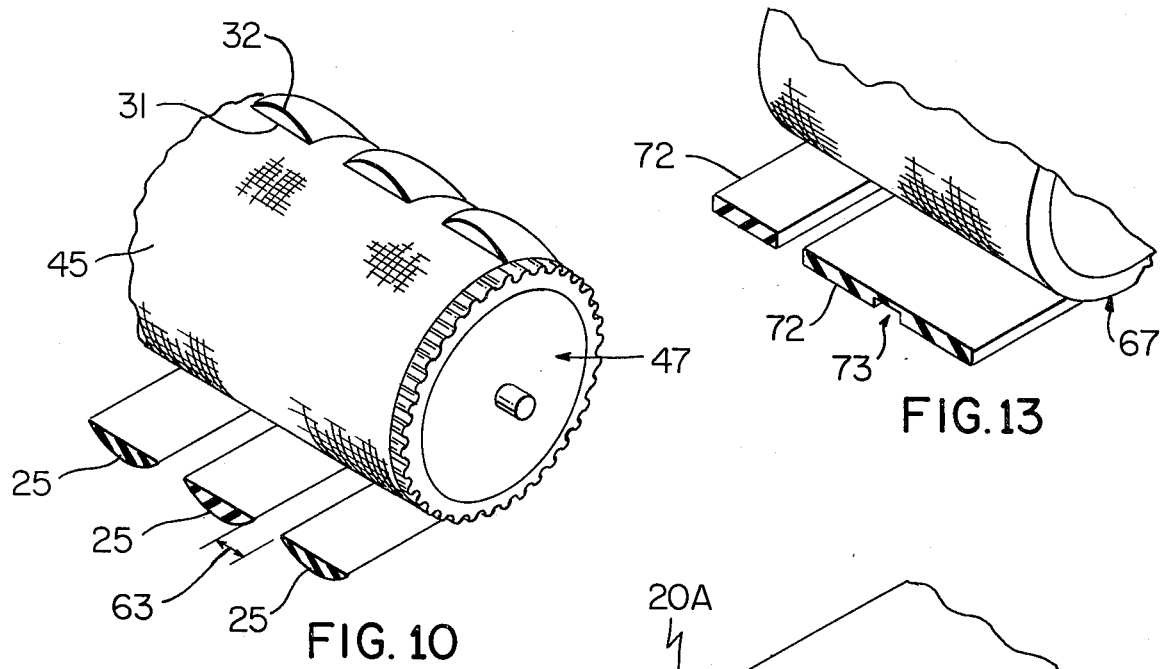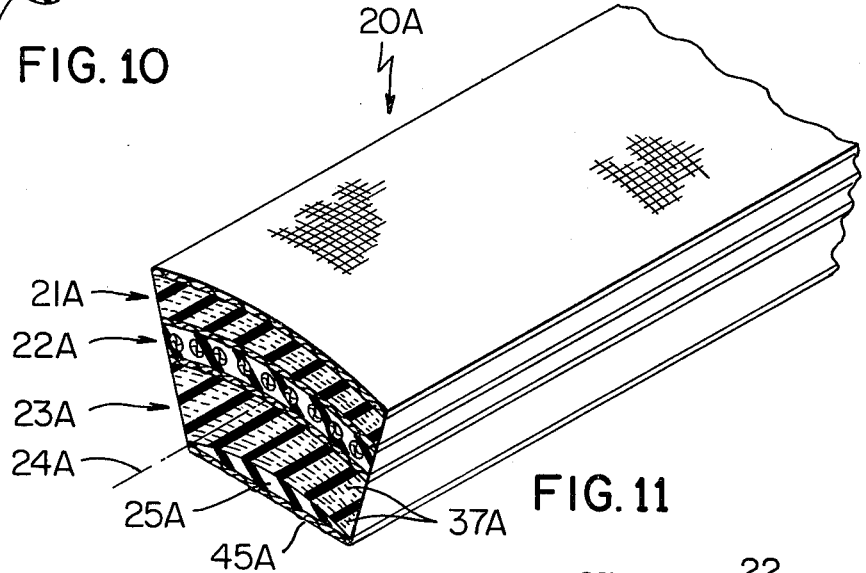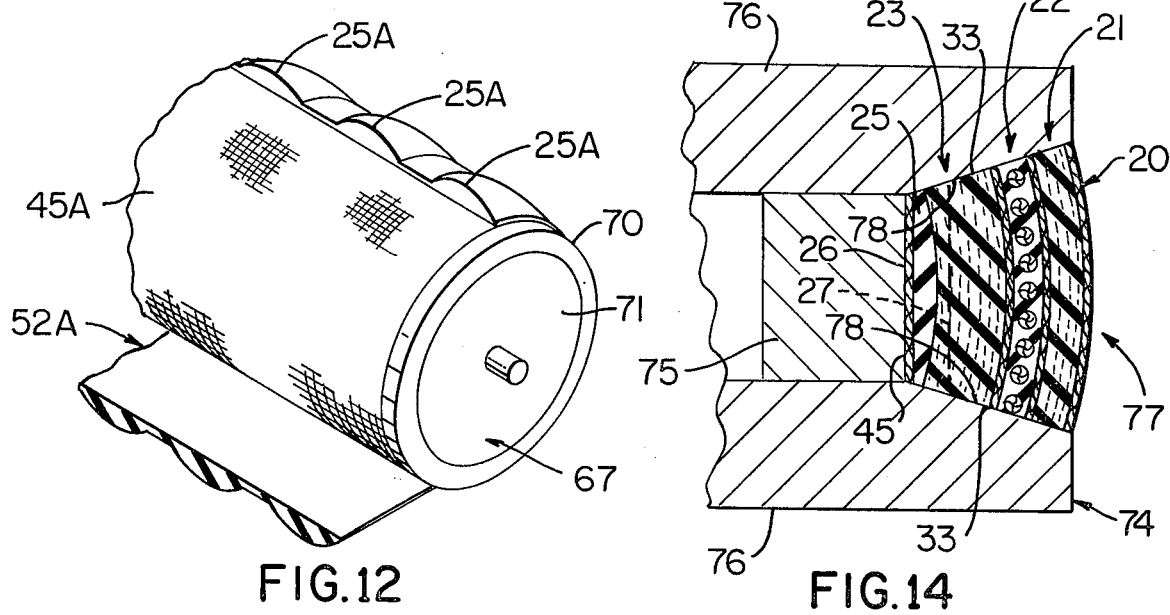

METHOD OF MAKING AN ARCHED ENDLESS BELT

BACKGROUND OF THE INVENTION

1. Field of the Invention

This invention relates to a method of making a polymeric arched endless power transmission belt and to a belt made employing such method.

2. Prior Art Statement

In applications where a polymeric endless power transmission belt is operated under comparatively high operating load it is important that such belt have substantial stiffness or rigidity transverse its longitudinal axis to assure that such belt does not "dish" or is stressed into a downwardly bowed configuration under load. This dishing results in abnormally high stresses in the edge cords of the belt causing breaking thereof and premature failure of such cords and the overall belt. Dishing also causes high heat buildup within elastomeric portions of the belt and this heat buildup degrades the adhesive bond between belt components as well as degrading the components themselves resulting in premature failure. There is also a tendency for such a highly loaded belt to be subjected to unusually high stresses in the outer portion of its compression section, especially when operating around sheaves of comparatively small diameter, and such stresses cause cracks which propagate into the body of the belt causing belt failure.

It is known in the art to provide a method of making a polymeric arched endless power transmission belt with the method comprising the steps of disposing in tubular form a plurality of uncured belt-defining layers wherein the layers are adapted to define corresponding sections of the belt and curing the layers in a controlled environment to define the belt having an arched configuration and as disclosed in U.S. Pat. No. 4,019,399 and wherein the arched configuration is for the purpose of minimizing dishing.

It is also known to provide a method of making an endless power transmission belt which utilizes randomly arranged elongate fibers which are disposed substantially perpendicular to the longitudinal axis of the belt to increase the transverse or lateral stiffness of the belt and as disclosed in U.S. Pat. No. 3,416,383 for a typical V-belt of trapezoidal cross section. A so-called central neutral axis belt is disclosed in U.S. Pat. No. 3,987,684 which uses fiber-loaded layers cooperating with fabric layers to increase its transverse rigidity.

It is also known to provide a method of making a toothed belt of substantially trapezoidal cross-sectional configuration which has the usual compression section and wherein the outer portion of the compression section has a toothed configuration which is provided with a resilient compound between the teeth thereof. The resilient compound is softer than the rest of the belt and is used for providing an increased traction area and forming a yielding surface which also reduces noise; and, as disclosed in U.S. Pat. No. 2,062,568.

Finally, it is known in the art to provide a method of making a comparatively high load capacity endless power transmission belt which employs stress-relief slits in its compression section as disclosed in U.S. Pat. No. 3,995,507, for the purpose of avoiding high stresses and cracks in the compression section and overall belt.

It is an object of this invention to provide an improved method of making a polymeric arched endless power transmission belt.

It is another object of this invention to provide a improved belt.

Other aspects, embodiments, objects, and advantages of this invention will become apparent from the following specification, claims, and drawings.

SUMMARY

In accordance with the present invention there is provided an improved method of making a polymeric arched endless power transmission belt which has minimum tendency to dish or crack in the manner mentioned above, when subjected to high operating loads. The method of this invention comprises the steps of disposing in tubular form a plurality of uncured belt-defining layers with the layers being adapted to define corresponding sections of the belt and curing the layers in a controlled environment to define the belt having a longitudinal axis and an arched configuration relative to the axis.

In accordance with one embodiment of the invention, the improved method comprises the steps of providing a belt building device and wrapping shaping means made of an uncured gum material around the belt building device and the disposing step comprises wrapping the plurality of layers against the shaping means so that during the curing step the shaping means and controlled environment cooperate to define the arched configuration of the belt including all of the layers with the shaping means being bonded to the layers and cured therewith during such curing step and comprising the inner portion of the belt, and the cured gum shaping means serving as a crack barrier for the inner portion of the belt thus defined.

In accordance with another embodiment of this invention there is provided a method of making a plurality of polymeric raw edged endless power transmission belts comprising the steps of disposing in tubular form a plurality of uncured belt-defining layers around a belt building drum with the layers being adapted to define corresponding sections of the belts, curing the layers in a controlled environment to define a belt sleeve, cooling the sleeve, and cutting the sleeve to define the raw edged belts wherein the belts are made in the form of arched belts due to the method employing the further steps of wrapping a plurality of shaping means made of an uncured gum material around the belt building drum prior to the disposing step with the plurality of shaping means cooperating with the controlled environment during the curing step to define a corresponding plurality of integral axially spaced arched belt defining portions in the layers and sleeve, each associated shaping means being bonded to the layers during the curing step and defining the inner portion of an associated arched belt defining portion and with the cutting step comprising cutting the sleeve on opposite sides of associated shaping means to define an associated arched belt therebetween and wherein the cured gum shaping means serves as a crack barrier for the inner portion of its associated arched belt.

Also provided in accordance with this invention is an improved arched belt made employing the method of this invention.

BRIEF DESCRIPTION OF THE DRAWINGS

The accompanying drawings show present preferred embodiments of this invention, in which FIG. 1 is an isometric view with parts in elevation, parts in cross section, and parts broken away illustrating one exemplary embodiment of a belt made utilizing the method of this invention;

FIG. 2 is a fragmentary isometric view illustrating initial method steps employed in making the belt of FIG. 1 and comprising wrapping fabric means about a toothed belt building drum followed by wrapping shaping means around the drum and fabric;

FIG. 3 is a fragmentary view with parts in elevation and parts in cross section illustrating method steps of disposing in tubular form a plurality of uncured belt defining layers around the drum, fabric layer, and shaping means as wrapped in FIG. 2;

FIG. 4 is a cross-sectional view taken essentially on line 4—4 of FIG. 3;

FIG. 10 is a view similar to FIG. 2 illustrating a modification of the shaping means in the form of a plurality of strips of uncured gum material;

FIG. 11 is a view similar to FIG. 1 illustrating another exemplary embodiment of a belt made utilizing the method of this invention;

FIG. 12 is a view similar to FIG. 2 illustrating initial method steps in defining the belt of FIG. 11;

FIG. 13 is a view similar to FIG. 12 illustrating two modifications of belt shaping means which may be employed in modified method steps to define the same belt sleeve and the making of another embodiment of the belt of this invention; and FIG. 14 is a fragmentary view with parts in elevation, parts in cross section, and parts broken away illustrating certain steps of a modification of the method of this invention.

DETAILED DESCRIPTION

Figure 5:
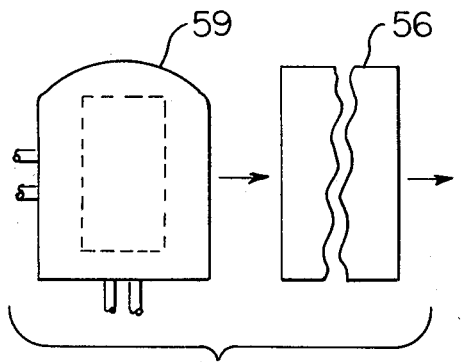
FIG. 5 is a schematic view illustrating the steps of curing the uncured belt defining layers of FIG. 4 to define a belt sleeve and the cooling of such sleeve.

Reference is now made to FIG. 1 of the drawings which illustrates one exemplary embodiment of an endless power transmission belt made utilizing the method of this invention and wherein such belt is designated generally by the reference numeral 20. The belt 20 is made primarily of polymeric material and comprises a tension section 21, a load-carrying section 22, and a compression section 23, with the belt having a longitudinal axis 24 and its sections disposed in an arch-like or arched configuration relative to the axis 24 and as will be readily apparent from FIG. 1. The belt 20 also comprises a strip 25 of comparatively soft gum material which comprises the outer portion of its compression section, and the strip 25 will be described in more detail subsequently.

The belt 20 has a toothed inner portion defined by alternating projections 26 and recesses 27 which define the outer portion of its compression section 23 whereby the belt has longitudinal flexibility which approaches the longitudinal flexibility of a conventional toothed belt; however, the belt 20 has optimum transverse rigidity due to its arched configuration, as seen in FIG. 1, which shows the belt sections 21-23 in an arched configuration whereby the top surface 29 of the belt is disposed is a circular segment having a radius 30.

The strip 25 of gum material is a strip of gum rubber of a type commonly used in the art and such strip serves as stress-relief means and a crack barrier for the compression section 23 and hence the entire belt 20. The gum material was employed during the manufacture of a belt sleeve from which the the belt 20 is cut to define the arched configuration of such belt.

The gum material 25 preferably has a hardness which is substantially less than the hardness of the remaining portions of the belt 20 and such hardness ranges between 35 and 80 as measured on the A scale of the commonly used Shore Durometer. The gum material 25 when viewed at any cross section perpendicular to the longitudinal axis 24 of the belt has a substantially plano-convex cross-sectional appearance defined by a planar or straight bottom portion 31 and a convex top portion 32 which is convex toward the interior of the belt 20.

The belt 20 is a typical toothed belt of substantially trapezoidal cross-sectional configuration and has non-parallel sides or side walls 33 which are symmetrically arranged about the axis 24. The straight outer or bottom portion 31 of the strip 25 extends between and adjoins side walls 33 at its opposite ends. The belt sections 21, 22, and 23 are suitably bonded together as a unitary mass and may be comprised of various materials and component portions, as is known in the art of making endless power transmission belts, and such sections will now be described in more detail.

The tension section 21 has an inner rubber impregnated fabric layer 34 and an outer rubber impregnated fabric layer 35. A polymeric or rubber matrix material 36 is disposed between the layers 34 and 35 and the rubber matrix 36 (FIG. 3) has randomly arranged elongate fibers 37 disposed therein substantially perpendicular to the longitudinal axis 24.

The load-carrying section 22 is comprised of a helically wound load-carrying cord 40 which is substantially centrally disposed within a gum material 41 in the form of gum cushions which sandwich the cord 40 therebetween, as is known in the art. The cord 40 may be made of one or more filaments of a high-strength load-carrying material.

The compression section 23 is comprised of an inner fabric layer 43 followed by a polymeric or rubber matrix material 44, the strip 25, and a fabric layer 45 bonded against the outside planar surface 31 of the strip 25. The fabric layers 43 and 45 are preferably polymer or rubber impregnated layers. The matrix material 44 of the compression section 23 also has a plurality of randomly arranged elongate fibers embedded therein and such fibers are also disposed substantially perpendicular to the longitudinal axis 24 of the belt and will also be designated by the same reference numeral 37 as the fibers 37 of the tesnion section 21.

The fibers 37 of the tension section 21 and compression section 23 and disposed in substantially parallel relation, as previously mentioned; and, such fibers 37 are disposed in an arched configuration corresponding to the arched configuration of each belt section. The fibers 37 were formed into their arched configuration by the gum material 25 during the manufacture of the belt sleeve S (FIGS. 6-8) from which the belt 20 was cut. The fibers 37 may be made of suitable fibrous materials utilized in the art of making endless power transmission belts, including organic materials, and such fibers may have diameters ranging between 0.001 inch and 0.050 inch and lengths ranging between 0.001 inch and several inches.

The belt 20 may be made utilizing the method of this invention and as will now be described with particular reference being made to FIGS. 2 through 9 of the drawings. In particular, the method comprises the steps of disposing in tubular form a plurality of uncured belt defining layers 46 (FIG. 3) around a belt building drum 47. The uncured layers 46 are comprised of compression section defining layers 23, load-carrying section defining layers 22, and tension section defining layers 21. The various uncured belt section defining layers of FIG. 3 have been designated by the same reference numerals 23, 22, and 21 as the corresponding sections of the completed belt 20, and this has been done for ease of description and understanding of the invention. The building drum 47, about which the layers 46 are disposed, has an outer portion made of a polymeric material in the form of a suitable synthetic plastic material 50 and an inner portion 51 made of metal.

The exemplary method disclosed herein comprises the steps of covering the building drum 47 with a rubber impregnated fabric layer 45 followed by wrapping the fabric layer 45 with a plurality of shaping means of uncured gum material and each also designated by the same reference numeral 25 as the cured gum material 25 in the completed belt 20. The fabric 45 and uncured gum 25 are wrapped around the building drum 47 prior to disposing in tubular form the remaining uncured compression section defining layers 23 and uncured belt section defining layers 22 and 21.

The uncured shaping means 25 are provided as an uncured sheet-like structure of gum material which is designated generally by the reference numeral 52; and, such shaping means 25 are defined as an integral part of and in parallel relation across such structure, as will be readily apparent from FIG. 2. The shaping means 25 are interconnected by integral interconnecting portions 53 of the sheetlike structure.

Figure 6:
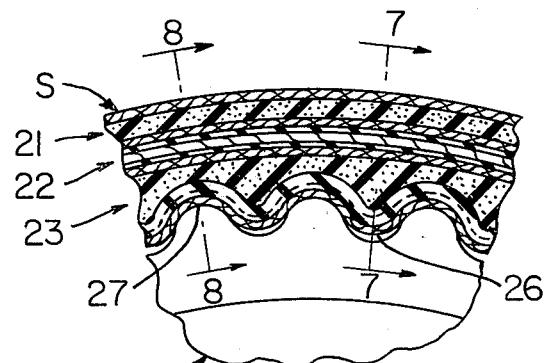
FIG. 6 is a fragmentary view with parts in cross section and parts in elevation particularly illustrating the belt sleeve after curing and cooling thereof.

As seen in FIG. 2 of the drawings, the building drum 47 has a plurality of alternating axial projections 54 and recesses 55 disposed circumferentially therearound in parallel relation and parallel to a central axis 56 of the building drum 47. The projections 54 and recesses 55 cooperate to define corresponding recesses 27 and projections 26 respectively in a cured belt sleeve S (FIG. 6).

The uncured belt defining layers 46 are disposed in position about the drum 47 as shown in FIGS. 2, 3, and 4. The layers, as illustrated in FIGS. 3 and 4, are then suitably cured in a controlled environment provided by a conventional curing device 59 which is illustrated schematically in FIG. 5 to define the cured belt sleeve S. The curing device 59 may utilize steam at controlled temperatures and pressures and such steam may be circulated both internally and externally of the building drum 47, as is known in the art, to cure the uncured layers 46 and define the belt sleeve S of FIG. 6.

The sleeve S is then suitable cooled in a cooling device 56, which is also illustrated schematically in FIG. 5. The cooling device 56 may be any device used in the art for cooling a cured belt sleeve S.

Figure 9:
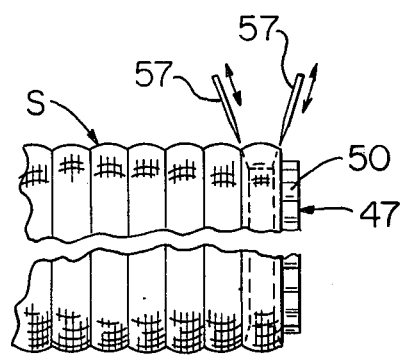
FIG. 9 is a view illustrating the step of cutting the cured and cooled belt sleeve of FIGS. 6-8 to define a plurality of arched raw-edged endless power transmission belts of FIG. 1.

The belt sleeve S is cut utilizing suitable cutting devices or cutters 57 as illustrated in FIG. 9. The cutting action is preferably achieved with the sleeve S disposed on its building drum 47 while supporting such drum on centers as is known in the art.

The sleeve S has a toothed inner portion defined by the toothed compression section defining portion of such sleeve whereby in order to cut such sleeve on the drum 47 it is necessary to cut through the outer polymeric or synthetic plastic portion 50 of the building drum 47. To facilitate this cutting, portion 50 is made of a material which is easily cut yet is capable of withstanding the temperatures and pressures encountered during curing and cooling. However, once the cutting action is complete, the plastic portion 50 is stripped from the outside of the drum 47 and a new outer portion is disposed around the metal portion 51 of such building drum in preparation for disposing in tubular form another plurality of uncured belt defining layers after wrapping shaping means of the uncured gum material in position to enable defining another belt sleeve similar to belt sleeve S of FIG. 6.

During the cutting utilizing the cutters 57 it will be appreciated that substantially triangular or wedge-like portions 60 of the belt sleeve S are cut away. Each wedgelike portion 60 is shown disposed between cut lines, represented by dot-dash lines 61, defined by the cutters 57. Further, each arched belt 20 cut from sleeve S is a toothed belt having an undulating inside surface defined by alternating projections 26 and 27 in the outer portion of the compression section.

The shaping means, i.e., cured gum 25, at any desired location throughout the entire axial length of the arched belt 20 is of substantially uniform transverse cross section and of plano-convex configuration, as described earlier. This will be readily apparent from FIG. 7 which shows a cross section of the belt sleeve S, and of belts 20 between cut lines 61, at cross sections through axially aligned belt apexes or projections 26 while FIG. 8 shows a similar cross section of the belt sleeve S, and of belts 20 between cut lines 61, at cross sections through axially aligned belt recesses 27 and the lowest points of such recesses.

Figure 7:
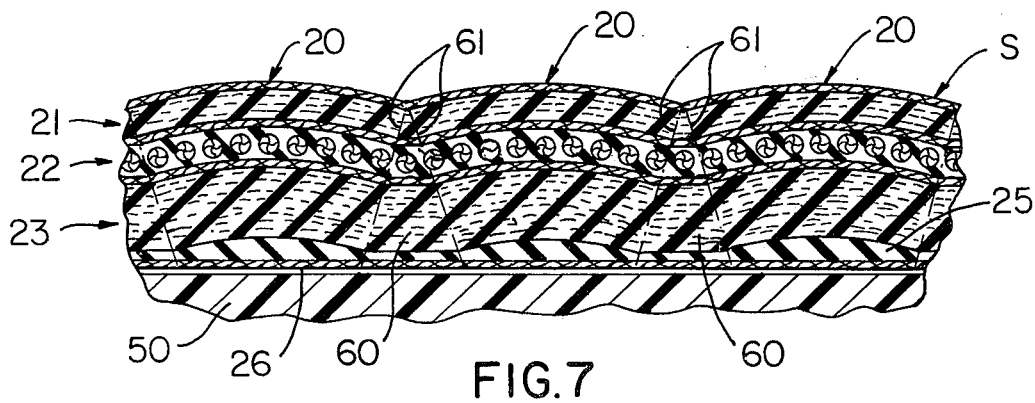
FIG. 7 is a fragmentary cross-sectional view taken essentially on the line 7—7 of FIG. 6.
Figure 8:
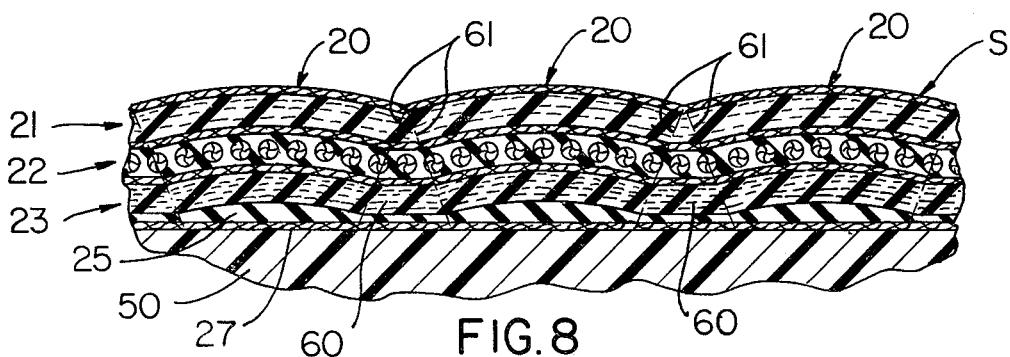
FIG. 8 is a view similar to FIG. 7 taken on the line 8—8 of FIG. 6.

Thus, it is seen that the plurality of shaping means or uncured strips of gum rubber 25 cooperate with the controlled environment of the belt curing device 59 during the curing step of FIG. 5 to define a plurality of integral axially spaced arched belt defining portions of the layers and sleeve S and as illustrated in FIGS. 7 and 8. Each arched belt defining portion has also been designated by the reference numeral 20 (between its cut lines 61) even though such portions have not been cut by cutters 57 as illustrated in FIG. 9.

The cutting step (FIG. 9) comprises cutting the sleeve S, with cutters 57, on opposite sides of an associated shaping means or shaping strip 25 to define the associated arched belt 20 therebetween; and, it will be appreciated that each associated shaping means 25 is bonded to its associated layers during the curing step and defines the inner portion of an associated arched belt defining portion 20. The cured gum shaping means 25 serves to define the arched belt 20 which has optimum transverse rigidity as well as longitudinal flexibility. In addition, the gum material utilized to define the arched configuration of the belt serves as a crack barrier for the inner portion of the belt 20.

The method of this invention has been described as using shaping means consisting of a sheet-like structure 52 having the plurality of shaping means 25 defined as an integral part thereof with interconnecting portions 53 of the sheet-like structure therebetween. However, such shaping means 25 may be as provided in FIG. 10 of the drawings which illustrates shaping means comprised of a plurality of separate uncured shaping strips of gum rubber which are disposed in spaced relation axially along the building drum 47 with each strip extending circumferentially around such building drum. It will be appreciated that the technique illustrated in FIG. 10 merely requires that the individual shaping strips 25 be suitably positioned in equally spaced apart relation as indicated by the typical spacing 63 therebetween and the spacing 63 may be substantially equal to the width 64 of the interconnecting portions 53 of the sheet-like structure 52 whereby the belts 20 defined using the strips 25 of FIG. 10 would be substantially identical to the previously described belts 20.

Nevertheless, regardless of whether the shaping means is in the form of a sheet-like structure, as shown in FIG. 2, or a plurality of separate strips, as shown in FIG. 10, the opposite ends of each shaping means 25 is suitably disposed in abutting relation or joined on a bevel or suitable joint so that each cured shaping means or gum portion 25 has a continuous and substantially uniform cross section throughout its endless path whereby each component 25 may serve its dual purpose of shaping means and crack barrier in a reliable manner.

Having described the belt 20 and method of making same wherein such belt is in the form of a toothed belt, i.e., having a toothed compression section, reference is now made to FIGS. 11 and 12 of the drawings which illustrate a similar arched belt and method steps in making same respectively wherein the belt is free of teeth and the belt is of the usual trapezoidal cross-sectional configuration having an arched configuration similar to the arched configuration illustrated in FIG. 2. Except for the absence of a toothed compression section, the belt of FIG. 11 is substantially identical to the belt 20 of FIG. 1; therefore, the belt of FIG. 11 will be designated by the general reference numeral 20A and its tension section, load-carrying section, and compression section will be designated by the reference numerals 21A, 22A, and 23A respectively.

In a similar manner, as described in connection with the belt 20, each belt 20A has a shaping means in the form of a gum strip 25A defining the outer portion of its compression section 23A with the gum material having been used during the manufacture of the belt sleeve from which the belt was cut to define the arched configuration in such belt 20A. The gum material has similar properties as previously described and it will be seen that the various sections 21A, 22A and 23A are substantially identical and similar to previously described sections.

The tension section 21A and compression section 23A of belt 20A also have randomly arranged elongate fibers 37A embedded therein and disposed perpendicular to the longitudinal axis 24A of the belt 20A. The fibers 37A are also disposed in substantially parallel relation and in an arched configuration corresponding to the arched configuration of its sections in a similar manner as described for the belt 20. Further, the fibers 37A may be substantially identical to the previously described fibers and thus will not be described again.

The only difference in the method of making the belts 20A and the belts 20 is that in making the belts 20A a plain building drum 67 (FIG. 12) is used instead of a toothed drum. Accordingly, the drum 67 is free of teeth and employs an outer polymeric portion 70 made of a plastic material, or the like, and an inner portion comprised of a metallic material 71. The fabric material 45A is wrapped around the drum 67 followed by sheet-like structure 52A having shaping means 25A defined as an integral part thereof. As described for the belts 20, the belt defining layers may then be wrapped in position in a similar manner as illustrated in FIGS. 3 and 4, followed by curing and cooling as shown in FIG. 5, and cutting as shown in FIG. 9 to define a plurality of belts identical to the belt 20A of FIG. 11.

During the cutting of the belt sleeve to define either of the belts 20 or 20A it will be appreciated that the cutting is preferably achieved with the sleeve S on its building mandrel or drum either 47 or 67. In this manner it is a simple procedure to move the cutters 57 across the axial length of the sleeve S and define each belt either 20 or 20A so that shaping means defined by the rubber gum material is symmetrically arranged and precisely located in its belt. In particular, with this symmetrical arrangement the inwardly or upwardly convex surface 32 and 32A of the gum material of each belt 20 and 20A respectively is disposed with its apex coplanar with a plane bisecting a transverse cross section through the belt. However, it will be appreciated that, if desired, the toothed belt sleeve S illustrated in FIG. 6 or the plain belt sleeve defined in the process of defining a plurality of belts 20A, may in each instance be stripped from its associated mandrel and then supported on a cutting mandrel, as is known in the art, and the cutting of the sleeve can also be achieved with precision inasmuch as shaping means of gum material in each instance is precisely located along the axial length of the sleeve.

The belt defining sleeve S has an undulating outside surface as illustrated in FIGS. 7, 8, and 9 which is defined by the shaping means 25 or 25A. This undulating outside surface aids in the cutting of the cured and cooled sleeve S using cutters 57.

In this disclosure of the invention various sections of each belt 20 and 20A are shown defined in a particular specific configuration utilizing a particular sequence of fabric layers, rubber impregnated layers, fiber-loaded layers, etc; however, it will be appreciated that the method of this invention may be utilized in defining arched belts wherein the various layers may be in any desired sequence, or any desired material or combination of materials, as is known in the art.

In this disclosure of the invention each shaping means, such as shaping means 25, whether provided in the form of the sheet-like structure of FIG. 2 or separate strips as shown in FIG. 10, are illustrated and described as having a straight outer surface 31 and an inwardly convex inner surface 32. However, it will be appreciated that such shaping means may have other cross-sectional configurations. To highlight this point, FIG. 13 has been presented and illustrates a fragmentary portion of a belt building drum similar to the drum 67 of FIG. 12 with a single shaping strip 72 at one end portion thereof and a sheet-like structure 73 at the opposite end portion thereof which has integral shaping means 72. Each shaping means or strip 72 is of substantially rectangular cross-sectional configuration and the rectangular configuration of each shaping means is disposed symmetrically within an associated belt to define the arched configuration therein, including all component portions or sections of the belt and including any stiffening fibers defined in one or more sections of such belt thus defined. However, it is to be understood that in using a rectangular strip, such strip would not extend across the full width of the compression section, otherwise an arched configuration would not result. Instead, the rectangular strip would extend across only from about ½ to ⅔ of the full width of the outer portion of the compression section while being centrally and symmetrically disposed therein whereby with this construction the belt defining layers would, in essence, bow or bend around the rectangular shaping means or strip 25 during curing to define an associated arched belt.

The method of this invention has been illustrated and described in connection with the making of a plurality of belts by forming a belt sleeve S and cutting such sleeve to define a plurality of arched endless power transmission belts. However, it will be appreciated that belts may be made individually as illustrated in the method of FIG. 14 of the drawings.

In particular, the modified method of FIG. 14 comprises the steps of disposing in tubular form a plurality of belt defining layers similar to the layers previously described and such layers will be designated by the reference numerals 23, 22, and 21 and define the compression section, load-carrying, and tension section defining layers respectively. As previously described, the layers are adapted to define corresponding sections of the belt 20 therefrom. The layers are cured in a controlled environment and in particular are cured utilizing a mold structure 74 to define the belt having a longitudinal axis and an arched configuration relative to the axis.

The belt building means of the mold device 74 comprises an inner building means in the form of a building ring 75 and shaping means 25 made of an uncured gum material which is disposed around the ring 75 after disposing of the fabric layer 45 in position. The belt defining layers 23, 22, and 21 are then wrapped against the shaping means 25 whereupon mold device 74 is suitably closed by suitably attaching the mold sides 76 in position to confine the belt body. The outer portion of the mold device is exposed or shown at 77 whereby the shaping means 25 and layers 23, 22, and 21 are subjected to a controlled curing environment similar to the steam pressure provided by the curing device 56. During curing, the shaping means 25 and the controlled pressures provided by the steam environment cooperate to define the arched configuration in the belt including all of its layers, and it will be appreciated that the shaping means or uncured shaping strip 25 is bonded to the layers and defines the inner portion of the belt thus made. In a similar manner as described earlier, the belt 20 of FIG. 14 has the gum material of the shaping means 25 which serves as a crack barrier for the inner portion of such belt.

The belt 20 defined, as shown in FIG. 14, is a toothed belt inasmuch as the ring 75 has outer teeth therein, and the non-parallel side walls 33 thereof are finished sides as produced by the corresponding surfaces 78 of the mold sides 76. Further, it will be appreciated that the molding ring 75 defines the toothed inner portion of the belt 20.

However, it is to be understood that the method basically illustrated in FIG. 14 for defining a single belt 20 may be employed in defining a belt similar to the belt 20A wherein the ring 75 would be a plain ring having a plain right circular cylindrical outside surface. It will also be appreciated that a rectangular strip similar to the rectangular strip illustrated in FIG. 13 may be utilized to make the belt of FIG. 14 provided that such a rectangular strip would be substantially narrower in width than the outer portion of its compression section, and as previously presented.

The fibers 37 provided in the tension section and compression section of each belt described herein are essentially as previously described. In practicing the method of this invention a plurality of such fibers are randomly disposed in spaced parallel relation in a sheet of an associated uncured matrix material and such matrix material may then be disposed so that the fibers 37 thereof are substantially parallel to the longitudinal or central axis to its associated building drum or ring. For example, in the belt 20, the fibers 37 are disposed in associated uncured rubber matrix material 36 and 44 of the tension and compression sections respectively. Once the sleeve, with the fibers 37 thus disposed is cured, the fibers are bowed to define an arch-like path or arched configuration corresponding to the arched configuration of the belt sections and overall belt.

Figure 9A:
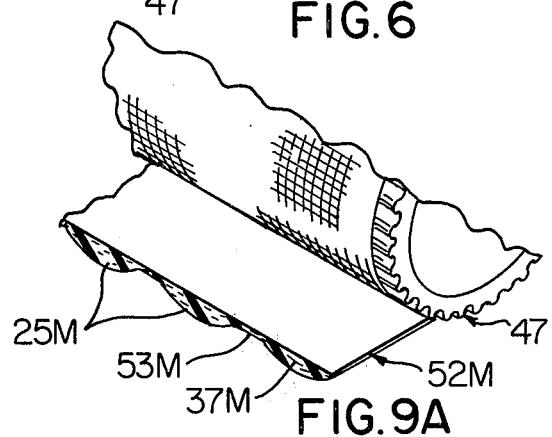
FIG. 9A is a view similar to the lower portion of FIG. 2 illustrating shaping means provided with reinforcing fibers.

Reference is now made to FIG. 9A of the drawings which illustrates an exemplary modification of uncured shaping means which is designated generally by the reference numeral 25M and disposed around a building drum 47 of the type described earlier. The shaping means 25M are provided as an integral part of an uncured sheet-like structure 52M of polymeric material; and, the shaping means 25M are disposed in parallel relation across the structure 52M and such shaping means are interconnected by integral interconnecting portions 53M of the sheet-like structure. The shaping means 25M may be used in the method of this invention and in defining the belt of this invention essentially as described previously whereby the previous description will not be repeated.

The main difference between the shaping means 25M and shaping means 25 is that the shaping means 25M utilizes a plurality of fibers which are disposed therein and such fibers are designated by the reference numeral 37M. The fibers 37M are randomly disposed in substantially parallel relation and substantially perpendicular to the longitudinal axis of the shaping means 25M and hence the longitudinal axis of its associated belt. As in the case of the fibers 37 previously described, the fibers 37M may be made of any suitable fibrous material utilized in the art of making endless power transmission belts. Further, the fibers 37M may have diameters and lengths essentially as described previously for the fibers 37.

The fibers 37M provide improved support for the polymeric matrix portion of the uncured shaping means 25M. For example, the fibers 37M, by their tensile stiffness in the fiber direction contribute to the stability of the arched configuration of the shaping means 25M.

Fibers 37M have only been illustrated and described in connection with the uncured shaping means 25M which are defined as an integral part of the sheet-like structure 52M which has integral interconnecting portions 53M. However, it is to be understood that the uncured shaping means 25 and 72 of the types illustrated in FIGS. 10 and 13 respectively may also be provided with fibers 37M and for the same reasons as described earlier. In addition, the reinforcing fibers 37M may be provided in the uncured shaping means of FIG. 12 utilized in making the belt of FIG. 11.

The matrix material defining the shaping means 25M is also preferably made of an uncured gum material and after curing such gum material has a hardness within the range previously described for the gum material 25. Further, although the cured gum shaping means 25M serves as a crack barrier for the inner portion of its associated arched belt, the fibers 37M in the cured shaping means also serve as reinforcement and tend to prevent any cracks that might develop in the compression section of the belt from enlarging in size or propagating toward the central portion of such belt.

In this disclosure, the various components of the belt have been illustrated by cross-hatching in the drawings as being made of rubber; however, it is to be understood that any suitable polymeric material employed in the art of making power transmission belts may be used instead of rubber, if desired. Further, although the uncured shaping means 25, 72, and 25M have been described as being preferably made of uncured gum material, such as gum rubber, it is to be understood that any suitable polymeric material, e.g., synthetic plastic, or the like, may be used to define such shaping means provided it is capable of providing the functions described herein.

Certain fabric layers have also been described herein as being rubber impregnated fabric layers. Accordingly, one or both surfaces of a suitable fabric material may be impregnated with rubber utilizing any suitable technique known in the art. Further, the fabric material may be woven fabric, non-woven fabric, knitted fabric, or any other fabric capable of being used in the art of making endless power transmission belts.

While present exemplary embodiments of this invention, and methods of practicing the same, have been illustrated and described, it will be recognized that this invention may be otherwise variously embodied and practiced within the scope of the following claims.

What is claimed is:

1. In a method of making a plurality of polymeric raw-edged endless power transmission belts, said method comprising the steps of, disposing in tubular form a plurality of uncured belt defining layers around a belt building drum, said layers defining corresponding sections of said belts, curing said layers in a controlled environment to define a belt sleeve, cooling said sleeve, and cutting said sleeve to define said raw-edged belts, the improvement in said method enabling the making of said belts as arched belts and comprising the steps of providing a plurality of shaping means each having a precontoured outer surface and each being made of uncured gum material, wrapping a plurality of said shaping means around said belt building drum prior to said disposing step so that said outer surfaces thereof are disposed in axial spaced apart relation and face outwardly from said drum, causing said plurality of shaping means to cooperate with said controlled environment during said curing step to define a corresponding plurality of integral axially spaced arched belt defining portions in said layers and sleeve without substantially changing the transverse cross-sectional profiles of said precontoured outer surfaces of said shaping means, and causing each associated shaping means to be cured and bonded to said layers during said curing step so as to define the inner portion of an associated arched belt defining portion, said cutting step comprising the step of cutting said sleeve on opposite sides of associated shaping means to define an associated arched belt with said cured gum shaping means thereof serving as a crack barrier for the inner portion of its associated arched belt.

2. A method as set forth in claim 1 and comprising the further step of covering said building drum with a fabric layer prior to wrapping of said shaping means, said fabric layer defining the inside surface of said belts.

3. A method as set forth in claim 1 in which said shaping means comprises a sheet-like structure having said plurality of shaping means defined as an integral part thereof in spaced relation across the sheet-like structure, and said wrapping step comprises wrapping said sheet-like structure around said building drum.

4. A method as set forth in claim 1 in which said shaping means comprises a plurality of shaping strips disposed axially along said building drum with each strip extending circumferentially around said building drum and defining the shaping means of an associated belt.

5. A method as set forth in claim 1 in which said building drum is a toothed drum defined by a plurality of alternating projections and recesses disposed circumferentially therearound and parallel to its central axis, said projections and recesses of said toothed drum cooperating to define corresponding recesses and projections in said belt sleeve during said curing step, said sleeve upon being cut during said cutting step defining said arched belts each having a compression section consisting of a toothed outer portion defined by alternating recesses and projections, and said cured gum shaping means comprising the toothed outer portion of its arched toothed belt.

6. A method as set forth in claim 5 in which said toothed drum has an outer portion made of a polymeric material which has said alternating projections and recesses, said cutting step comprises cutting said sleeve with the sleeve on its building drum thereby cutting through part of the polymeric toothed outer portion of the building drum to thereby assure defining said arched toothed belts with great precision, and said polymeric outer portion of said building drum serving as a cutting anvil during said cutting step.

7. A method as set forth in claim 1 in which said building drum is a plain drum having a right circular cylindrical outside surface and said sleeve upon being cut during said cutting step defining said arched belts each having a compression section consisting of a plain outer portion, said cured gum shaping means comprising the plain outer portion of its arched belt.

8. A method as set forth in claim 7 in which said plain drum has an outer portion made of a polymeric material and said cutting step comprises cutting said sleeve with the sleeve on its building drum thereby cutting through part of the polymeric outer portion of the building drum to thereby assure defining said arched belts with great precision, and said polymeric outer portion of said building drum serving as a cutting anvil during said cutting step.

9. A method as set forth in claim 1 in which said disposing step comprises, disposing in said tubular form said plurality of belt defining layers comprised of a compression section defining layer, a load-carrying section defining layer, and a tension section defining layer, at least one of said layers comprising a polymeric matrix material having randomly arranged elongate fibers embedded therein substantially in parallel relation and substantially parallel to the longitudinal axis of said building drum, said fibers being disposed substantially in an arched configuration corresponding to the arched configuration of its section during said curing step by the cooperating action of said shaping means and controlled environment.

10. A method as set forth in claim 9 in which at least another of said layers also comprises a polymeric matrix material having randomly arranged elongate fibers embedded therein substantially in parallel relation and parallel to said axis, said fibers of said other layer also being disposed in an arched configuration corresponding to the arched configuration of its section by the cooperating action of said shaping means and said controlled environment.

11. A method as set forth in claim 9 in which said step of wrapping said plurality of shaping means comprises wrapping said shaping means each having a substantially plano-convex cross-sectional configuration when viewed at any cross section perpendicular to its longitudinal axis.

12. A method as set forth in claim 1 and comprising the further step of providing each of said plurality of shaping means with randomly arranged elongate fibers embedded therein substantially in parallel relation and substantially perpendicular to its longitudinal axis, said fibers providing improved support for the matrix portion of the uncured shaping means.

13. In a method of making a polymeric arched endless power transmission belt, said method comprising the steps of, disposing in tubular form a plurality of uncured belt-defining layers, said layers defining corresponding sections of said belt, and curing said layers in a controlled environment to define said belt having a longitudinal axis and an arched configuration relative to said axis, the improvement in said method comprising the further steps of, providing belt building means, providing a shaping means having a precontoured outer surface wherein the thickness of the shaping means varies axially of the building drum and being made of an uncured gum material, wrapping said shaping means around said belt building means so that said outer surface thereof faces outwardly from said belt building means, said disposing step comprising the step of wrapping said plurality of layers against said shaping means, said curing step causing said shaping means and controlled environment to cooperate to define said arched configuration of said belt in all of said layers without substantially changing the transverse cross-sectional profile of said precontoured outer surface of said shaping means, and causing said shaping means to be bonded to said layers and cured therewith during said curing step so as to provide an inner portion of said belt and serve as a crack barrier for said inner portion.

14. A method as set forth in claim 13 in which said disposing step comprises, disposing in said tubular form said plurality of belt defining layers comprised of a compression section defining layer, a load-carrying section defining layer, and a tension section defining layer, at least one of said layers comprising a polymeric matrix material having randomly arranged elongate fibers embedded therein substantially in parallel relation and perpendicular to said axis, said fibers being disposed substantially in an arched configuration of its section during said curing step by the cooperating action of said shaping means and controlled environment.

15. A method as set forth in claim 14 in which at least another of said layers also comprises a polymeric matrix material having randomly arranged elongate fibers embedded therein substantially in parallel relation and perpendicular to its said axis, said fibers of said other layer also being disposed in an arched configuration corresponding to the arched configuration of its section by the cooperating action of said shaping means and said controlled environment.

16. A method as set forth in claim 15 in which said step of providing a belt building means comprises providing a belt building ring and said step of wrapping shaping means comprises wrapping a single shaping strip around said building ring.

17. A method as set forth in claim 16 in which said step of providing a belt building ring comprises providing a toothed ring having an outer portion defined by alternating recesses and projections, said toothed ring cooperating with said controlled environment during said curing step to define a toothed inner portion in said belt defined by alternating projections and recesses.

18. A method as set forth in claim 16 in which said step of providing a belt building ring comprises providing a plain ring having a right circular cylindrical outside surface, said plain ring cooperating with said controlled environment during said curing step to define an inner portion of said belt which is free of undulations.

19. A method as set forth in claim 16 in which said step of wrapping said shaping means comprises wrapping shaping means of substantially rectangular cross-sectional configuration.

20. A method as set forth in claim 16 in which said step of wrapping shaping means comprises wrapping shaping means having a substantially plano-convex cross-sectional configuration when viewed at any cross section perpendicular to said longitudinal axis.

21. A method as set forth in claim 20 and comprising the further step of wrapping a fabric layer against said belt building means followed by wrapping said shaping means against said fabric layer, said fabric layer defining the exposed surface of the compression section of said belt.

22. A method as set forth in claim 13 and comprising the further step of embedding elongate fibers in the uncured gum shaping means in a random manner and substantially in parallel relation yet substantially perpendicuar to its longitudinal axis, said fibers providing improved support for the matrix portion of the uncured gum shaping means.

* * * * *